United States Patent Office 3,615,071
Patented Oct. 26, 1971

3,615,071
FLEXIBLE MOLD
Jack R. Harper, Midland, Mich., assignor to
Dow Corning Corporation, Midland, Mich.
Filed Apr. 16, 1969, Ser. No. 816,779
Int. Cl. B28b 7/06
U.S. Cl. 249—112      3 Claims

ABSTRACT OF THE DISCLOSURE

A method of forming shaped articles of polyester, polyurethane or epoxy resin by using a flexible mold wherein a thin continuous film of a methyl ethyl ketone soluble copolymer of vinylidene chloride and acrylonitrile is applied to the shape forming surface of the flexible mold prior to molding an article is disclosed. This process provides a shaped article having a thin coating of the copolymer of vinylidene chloride and acrylonitrile on the surface. This process extends the useful life of the mold.

---

This invention relates to a method of molding with a flexible mold, wherein the shape forming surface of the flexible mold is coated with a thin continuous film of a methyl ethyl ketone soluble copolymer of vinylidene chloride and acrylonitrile.

This invention also relates to the shaped article of polyester, polyurethane and epoxy resin coated with a thin coating of a copolymer of vinylidene chloride and acrylonitrile.

The use of flexible molds in preparing shaped articles has become increasingly important in recent years. A flexible mold, especially silicone rubber, provides exceptionally fine details of the duplicated surface. High temperatures can be avoided, since many of the flexible molds are made of materials which set and cure at room temperature. Thus, the details of wood grain, wood carving, fabrics, and the like can be duplicated with great accuracy without causing damage to the original positive. Also the flexible mold makes it easier to remove the mold from the molded or cast part. The flexible molds also permit fewer parts to be molded for any one purpose, especially when complicated or irregular shapes are involved, since the flexible mold can be bent out of shape during the removal of the molded part. The mold being flexible will often return to its original shape for further molding processes. Although the flexible molds have many fine features, one disadvantage in using them is the flexible mold is limited in the number of molded parts which can be produced from a single mold. Since some of the materials useful for making the flexible molds are expensive, such as the silicone rubber, the number of molded parts from each mold determines the usefulness of the mold. The life of the flexible mold can now be extended by using this invention.

An object of this invention is to provide a process of molding whereby the useful life of a flexible mold is extended. Another object is to provide a flexible mold which has an extended useful life. Still another object is to provide a molded shaped article with a coating of a copolymer of vinylidene chloride and acrylonitrile. These and other objects will become apparent from the following detailed description of the present invention.

The present invention relates to a method of forming a shaped article comprising placing a curable, catalyzed, polymeric material selected from the group consisting of polyester, polyurethane and epoxy resin in a flexible mold, curing said polymeric material and thereafter removing the shaped article from the mold, the improvement comprising applying a thin continuous film of a methyl ethyl ketone soluble copolymer of vinylidene chloride and acrylonitrile on the shape forming surface of said flexible mold before placing the curable, catalyzed, polymeric material in the flexible mold.

Flexible molds and the materials used in making the flexible molds are well known in the art. Also the methods for making the flexible molds are well known. Any of the conventional techniques for making a flexible mold can be used. The shape of the mold is not critical to the function of the present invention.

Molds which are flexible can be made of any of the well known materials for that purpose. Examples of the materials of which the flexible molds can be made include silicone rubber, especially those which are room temperature vulcanizing, neoprene, flexible epoxy, urethane elastomer, fluoroplastics, polysulfide rubber, natural rubber, butyl rubber, plasticized poly(vinyl chloride), chlorinated polyethylene and acrylonitrile-butadiene-sytrene polymers, among others.

The method of this invention does not depend upon the method of preparing the flexible mold, but it is related to the use of the flexible mold in the molding of shaped articles.

After the flexible mold is prepared, the shape forming surface of the flexible mold is coated with a thin continuous film of a methyl ethyl ketone soluble copolymer of vinylidene chloride and acrylonitrile. The method of applying the methyl ethyl ketone soluble copolymer of vinylidene chloride and acrylonitrile is not critical, as long as, a thin continuous film is applied over the shape forming surface. The best means of applying the methyl ethyl ketone soluble copolymer of vinylidene chloride and acrylonitrile to obtain a thin continuous film is from an organic solvent solution of the copolymer which is sprayed on the shape forming surface of the flexible mold. The organic solvent is then allowed to evaporate and a thin continuous film of the methyl ethyl ketone soluble copolymer of vinylidene chloride and acrylonitrile is deposited on the shape forming surface of the flexible mold. Other means of application of the copolymer to the shape forming surface of the flexible mold can be used, such as brushing, dabbing, swabbing, rinsing and the like. The best form of the methyl ethyl ketone soluble copolymer of vinylidene chloride and acrylonitrile is in an organic solvent solution. Organic solvents include methyl ethyl ketone, mesityl oxide, cyclohexanone, isophorone, tetrahydrofuran, dimethylformamide, and a mixture of one of the above with acetone, methyl isobutyl ketone, methyl-n-amyl ketone, ethyl acetate, butyl acetate, amyl acetate, dioxane, propylene oxide, nitromethane, nitroethane, 2-nitropropane, toluene, xylene, hydrocarbons, methanol, isopropyl alcohol, glycol ethers, methylene chloride, carbon tetrachloride, ethylene dichloride, trichloroethylene, chlorobenzene and o-dichlorobenzene. The particular organic solvent system selected should consider the material of the flexible mold, the solubility of the copolymer of vinylidene chloride and acrylonitrile, the ease of removal after application to the shape forming surface of the flexible mold and the deposition of the thin continuous film. The preferred solvent system is methyl ethyl ketone or a mixture of methyl ethyl ketone and ethylene glycol of ethyl ether.

In addition to the organic solvent, it is also preferred to pigment the solution of the methyl ethyl ketone soluble copolymer of vinylidene chloride and acrylonitrile. The pigment provides an aid in application. With a pigmented solution of the copolymer, the thickness of the film on the shape forming surface of the flexible mold can be readily ascertained and no area will be missed if a pigmented solution is used. Although a pigment is not required, a pigmented thin continuous film of the methyl ethyl ketone soluble copolymer of vinylidene chloride and acrylonitrile can be applied in an even film at a faster rate. Also one avoids double or triple application in some areas of the shape forming surface of the flexible mold with single application on other areas. Thus, a pigment assists in the application of a uniform thin continuous film of the methyl ethyl ketone soluble copolymer of vinylidene chloride and acrylonitrile.

Any of the copolymers of vinylidene chloride and acrylonitrile which are soluble in methyl ethyl ketone are suitable for this invention. For the purposes of this invention, a copolymer of vinylidene chloride and acrylonitrile is considered soluble, if at least 5 weight percent can be dissolved in methyl ethyl ketone. The preferred copolymers of vinylidene chloride and acrylonitrile are thouse having from 5 to 30 weight percent acrylonitrile.

The preferred compositions applied to the shape forming surface of the flexible mold are those having 5 to 25 weight percent of the copolymer of vinylidene chloride and acrylonitrile, 70 to 95 weight percent organic solvent, and 1 to 10 weight percent pigment.

Any of the pigments found in the art can be used to pigment the methyl ethyl ketone soluble copolymer of vinylidene chloride and acrylonitrile. Examples of pigments include titanium dioxide, carbon black, dinitraline orange toner, molybdate orange, toluidine red toners, chrome yellow, phthalocyanine green, Hansa yellow, and phythalocyanine blue. Other than pigments, soluble dyes can be used. The particular pigment can be selected to correspond to the desired color of the molded shaped article, since the molded shaped article will have a thin coating of the methyl ethyl ketone soluble copolymer of vinylidene chloride and acrylonitrile on the surface which corresponds to the thin continuous film of the methyl ethyl ketone soluble copolymer of vinylidene chloride and acrylonitrile on the shape forming surface of the flexible mold.

After the thin continuous film of the methyl ethyl ketone soluble copolymer of vinylidene chloride and acrylonitrile has been applied to the shape forming surface of the flexible mold and any solvents have been removed, a curable, catalyzed, polymeric material is placed in the flexible mold.

The curable, catalyzed, polymeric materials can be a polyester, a polyurethane or an epoxy resin. The polyester, polyurethane and epoxy resin can be any of those conventionally used in the art. The polyurethane, for example, can be either the solid type or the foamed type. The curable, catalyzed, polymeric materials are well known in the art and can be purchased commercially. The polyester, polyurethane and epoxy resin are preferably those which are curable without the application of heat. Since the flexible molds are organic materials which are only useful to certain temperatures, the curing temperatures must not exceed the decomposition temperature of the flexible mold.

After the curable, catalyzed, polymeric material has cured, the shaped article is removed from the flexible mold by conventional techniques.

The present method of molding shaped articles using flexible molds is applicable to both single molding operations or continuous molding operations.

The thin continuous film of the methyl ethyl ketone soluble copolymer of vinylidene chloride and acrylonitrile is applied before each molding of a shaped article, since the thin continuous film of the methyl ethyl ketone soluble copolymer of vinylidene chloride and acrylonitrile is transferred from the flexible mold to the shaped article.

Flexible molds which use this process have an extended useful life. For example, a silicone rubber mold will provide 20 to 30 releases of a cured polyurethane without the application of the thin continuous film of the methyl ethyl ketone soluble copolymer of vinylidene chloride and acrylonitrile whereas with the thin continuous film of the methyl ethyl ketone soluble copolymer of vinylidene chloride and acrylonitrile 100 or more releases can be obtained. Even the conventional release agents will not extend the usual life of the flexible mold in the same manner as the present coating. Many of the conventional release agents have additional problems such as the molded shaped articles are not paintable when they are used.

The shaped articles prepared by the present method have a thin continuous coating of the copolymer of vinylidene chloride and acrylonitrile on the surface. This coating is paintable, stainable and otherwise can be modified by decorative means. Thus, furniture can be prepared from the curable, catalyzed, polymeric materials and then stained or painted so that they approximate very closely the furniture made from wood. Since the shaped article will have a coating of the copolymers of vinylidene chloride and acrylonitrile, a pigmented version will provide a shaped article which already contains color even before any painting or staining is done. In some cases additional coloring will not be necessary.

The present invention thus provides a process of making shaped articles wherein the life of the flexible mold is extended, and the shaped article contains a coating of a copolymer of vinylidene chloride and acrylonitrile.

Flexible molds made from silicone rubber are particularly useful, since they can produce large numbers of molded shaped articles before the flexible mold becomes useless. Also the room temperature vulcanizing silicone rubber is of particular interest, since there is no heating step in curing the flexible mold, a variety of subjects can be copied which would normally be effected by heat, and it is originally incompatible with many organic polymers. Another useful flexible mold is prepared from urethane elastomer.

A unique advantage of the present invention is that polyurethanes, both solid and foam can be molded from a flexible mold made of urethane elastomer.

One difficulty which has been overcome by the present invention is that even with the use of release agents the flexible mold and the polyester, polyurethane or epoxy resin soon became compatible and thus will not release from the flexible mold, since the polymeric material being molded adheres to the flexible mold surface. The present process delays this process of compatibility and thus extends the useful life of the flexible mold.

The following examples are illustrative only and should not be construed as limiting the present invention which is properly delineated in the claims.

EXAMPLE 1

A room temperature vulcanizable silicone rubber mold was prepared. A commercially available polyester which was catalyzed was placed in the mold and the polyester was allowed to cure. The molded shaped article was then removed from the mold. This process was repeated until a molded shaped article could not be removed from the mold. The number of molded polyester shaped articles, which were made before a shaped article could not be separated from the mold, was 58.

Using the same silicone rubber to make the mold of the same shaped and using the same polyester, the above process was reatepd except that prior to the placing of the catalyzed polyester into the mold for each shaped article, the following solution was sprayed onto the shape forming surface to provide a thin continuous film:

16.7 weight percent of a methyl ethyl ketone soluble copolymer of 80 weight percent vinylidene chloride and 20 weight percent acrylonitrile,
75 weight percent methyl ethyl ketone,
5 weight percent titanium dioxide,
3.3 weight percent of a light yellow pigment.

The methyl ethyl ketone was allowed to evaporate before the polyester was placed in the mold. The number of molded polyester shaped articles which were made before a shaped article could not be separated from the mold was 133.

Each of the molded shaped articles had a coating of a pigmented copolymer of vinylidene chloride and acrylonitrile. The molded polyester articles were painted without difficulty when the copolymer of vinylidene chloride and acrylonitrile was used.

EXAMPLE 2

A silicone rubber mold in a floral design was prepared from a room temperature vulcanizable silicone rubber which cures through ketoxime functionality of a polydimethylsiloxane polymer. A commercially available polyurethane was molded as described in Example 1, except the first series contained no coating on the shape forming surface of the mold, the second series contained a commercial acrylic coating on shape forming surface of the mold and the third series contained a thin continuous film of the copolymer solution described in Example 1 and applied as described in Example 1. The number of polyurethane floral design molded articles which were obtained before a molded article could not be separated from the mold was 31 where no coating was used, 47 where the acrylic coating was used and 75 where the copolymer of vinylidene chloride and acrylonitrile was used.

The same series of moldings were repeated except the design was an N shape. The number of polyurethane N shaped articles which were obtained before a molded article could not be separated from the mold was 21 where no coating was used, 46 where the acrylic coating was used and 80 where the copolymer of vinylidene chloride and acrylonitrile was used.

EXAMPLE 3

Equivalent results were obtained when a copolymer of 91 weight percent vinylidene chloride and 9 weight percent acrylonitrile was substituted for the copolymer of vinylidene chloride and acrylonitrile in the composition of Example 1.

EXAMPLE 4

Equivalent results were obtained when the following composition was substituted for the solution containing the copolymer of vinylidene chloride and acryonitrile in Example 2:

9.4 weight percent of a methyl ethyl ketone soluble copolymer of 80 weight percent vinylidene chloride and 20 weight percent acrylonitrile,
85.7 weight percent of methyl ethyl ketone,
2.5 weight percent of ethylene glycol ethyl ether,
1.9 weight percent titanium dioxide,
0.5 weight percent of a light yellow pigment.

EXAMPLE 5

The number of molded polyurethane foam shaped articles which released from a flexible mold made of the materials listed in the following table were determined by the procedure described in Example 1, except the total number of molded polyurethane foam shaped articles which released from the mold coated with the composition containing the copolymer of vinylidene chloride and acrylonitrile was not determined, since it was considered that if the number of releases with the coating exceeded the number of released made before a molded shaped article could not be released from the mold when no coating was used, the thin continuous film of the copolymer of vinylidene chloride and acrylonitrile was useful in extending the life of the flexible mold.

| Material of the flexible mold | Number of molded shaped articles, maximum, no coating | Number of molded shaped articles, coated |
|---|---|---|
| Poly(vinyl chloride) | 3 | >4 |
| Chlorinated polyethylene | 2 | >3 |
| Polymer of acrylonitrile, butadiene and styrene | 2 | >3 |
| Flexible epoxy | 2 | >3 |
| Polysulfide rubber | 1 | >2 |
| Neoprene | 6 | >7 |
| Butyl rubber | 4 | >5 |
| Urethane elastomer | 2 | >3 |

EXAMPLE 6

When the following compositions are substituted for the composition of Example 1, equivalent results are obtained:

(A)

5 weight percent of a methyl ethyl ketone soluble copolymer of 75 weight percent vinylidene chloride and 25 weight percent acrylonitrile, and
95 weight percent methyl ethyl ketone.

(B)

20 weight percent of a methyl ethyl ketone soluble copolymer of 95 weight percent vinylidene chloride and 5 weight percent acrylonitrile,
70 weight percent methyl ethyl ketone, and
10 weight percent pigment.

(C)

25 weight percent of a methyl ethyl ketone soluble copolymer of 70 weight percent vinylidene chloride and 30 weight percent acrylonitrile,
74 weight percent methyl ethyl ketone, and
1 weight percent pigment.

(D)

15 weight percent of a methyl ethyl ketone soluble copolymer of 5 weight percent vinylidene chloride and 95 weight percent acrylonitrile,
70 weight percent methyl ethyl ketone,
10 weight percent ethyl acetate, and
5 weight percent pigment.

(E)

10 weight percent of a methyl ethyl ketone soluble copolymer of 50 weight percent vinylidene chloride and 50 weigth percent acrylonitrile,
40 weight percent cyclohexanone,
40 weight percent tetrahydrofuran,
5 weight percent trichloroethylene,
5 weight percent pigment.

EXAMPLE 7

Equivalent results are obtained when a commercially available epoxy resin is substituted for the polyester of Example 1.

That which is claimed is:
1. A flexible mold suitable for making a shaped article comprising a flexible mold having a shape forming surface coated with a thin continuous film of a copolymer of vinylidene chloride and acrylonitrile.

2. The flexible mold in accordance with claim 1, in which the flexible mold is silicone rubber.

3. The flexible mold in accordance with claim 1, in which the flexible mold is urethane elastomer.

References Cited

UNITED STATES PATENTS

| | | | |
|---|---|---|---|
| 2,083,484 | 6/1937 | Zampol | 249—114 X |
| 3,127,457 | 3/1964 | Di Pinto | 18—47 UX |
| 3,353,220 | 11/1967 | Lenoble | 18—36 |
| 3,428,725 | 2/1969 | Delmonte | 264—338 X |
| 3,465,076 | 9/1969 | Asami | 264—255 |
| 3,492,394 | 1/1970 | Heine | 264—297 |

J. SPENCER OVERHOLSER, Primary Examiner

N. E. LEHRER, Assistant Examiner

U.S. Cl. X.R.

18—47; 249—114